(12) United States Patent
Delobel

(10) Patent No.: US 10,161,564 B1
(45) Date of Patent: Dec. 25, 2018

(54) DRINK RECEPTACLE WITH ELASTOMERIC, SEMI-RIGID STRAP FOR INTERFERENCE FIT SECUREMENT

(71) Applicant: Roland Delobel, Henderson, NV (US)

(72) Inventor: Roland Delobel, Henderson, NV (US)

( * ) Notice: Subject to any disclaimer, the term of this patent is extended or adjusted under 35 U.S.C. 154(b) by 0 days.

(21) Appl. No.: 15/911,025

(22) Filed: Mar. 2, 2018

Related U.S. Application Data

(63) Continuation-in-part of application No. 15/635,172, filed on Jun. 27, 2017.

(51) Int. Cl.
*F16M 13/02* (2006.01)
*A47C 7/62* (2006.01)

(52) U.S. Cl.
CPC ............. *F16M 13/022* (2013.01); *A47C 7/62* (2013.01)

(58) Field of Classification Search
USPC ........... 248/205.2, 311.2, 312; 206/340, 428, 206/446, 467, 468, 493, 822; 220/656, 220/657
See application file for complete search history.

(56) References Cited

U.S. PATENT DOCUMENTS

| | | | | |
|---|---|---|---|---|
| 2,676,336 A * | 4/1954 | Gilmer | ................ | B60N 2/2854 5/94 |
| 4,120,426 A * | 10/1978 | Grubbs | ................ | B60N 3/103 222/181.3 |
| 4,466,659 A * | 8/1984 | Carpentier | ............... | A47C 7/70 108/149 |
| 4,757,928 A * | 7/1988 | Browne | ................ | B60N 3/103 224/275 |
| 4,989,811 A * | 2/1991 | Millis | ................... | A61J 9/0615 215/13.1 |
| 5,249,770 A * | 10/1993 | Louthan | ................... | A47K 1/09 248/205.2 |
| 5,528,785 A * | 6/1996 | Petrus | ................. | A47D 15/003 297/7 |
| 5,622,346 A * | 4/1997 | Story, Jr. | .................. | A45F 5/02 224/148.6 |
| 5,632,050 A * | 5/1997 | Zajas | ................... | A47C 20/026 5/632 |
| 5,813,579 A * | 9/1998 | Hendrickson | ......... | B60N 3/103 224/42.11 |
| 5,868,294 A * | 2/1999 | Webster | ................. | B60R 7/043 224/275 |
| 5,967,345 A * | 10/1999 | Subotin | .................... | A47C 7/62 211/119.007 |
| 6,286,798 B1 * | 9/2001 | Chun | ................. | A47G 23/0216 206/218 |
| 6,513,686 B1 * | 2/2003 | Ben-Sasson | ............ | B60N 3/18 224/275 |
| 7,021,825 B1 * | 4/2006 | Schultz | ................. | A47D 13/06 224/438 |
| 7,117,553 B2 * | 10/2006 | Fairchild | ............... | A47D 13/08 5/655 |
| 8,662,362 B1 * | 3/2014 | Bastian | ............... | H04B 1/3888 224/197 |
| 9,722,440 B2 * | 8/2017 | Webb | .................. | H02J 7/0044 |

(Continued)

*Primary Examiner* — Terrell L McKinnon
*Assistant Examiner* — Michael McDuffie
(74) *Attorney, Agent, or Firm* — Steven Rinehart

(57) ABSTRACT

An interchangeable beverage holder comprising an elongated strap adapted to form a friction fit with furniture and secured a receptacle adapted to receive a beverage.

7 Claims, 5 Drawing Sheets

(56) References Cited

U.S. PATENT DOCUMENTS

| | | | |
|---|---|---|---|
| 2002/0148868 A1* | 10/2002 | Dion-Bildstein | B60N 3/103 224/401 |
| 2003/0205650 A1* | 11/2003 | Lale | H01H 9/0235 248/205.2 |
| 2004/0140407 A1* | 7/2004 | Morris | A61J 9/0638 248/102 |
| 2005/0051690 A1* | 3/2005 | Phillips | A47C 7/62 248/311.2 |
| 2010/0051633 A1* | 3/2010 | Porte | A45C 5/14 220/737 |
| 2010/0084531 A1* | 4/2010 | Schuchman | A47G 23/0225 248/311.2 |
| 2011/0101054 A1* | 5/2011 | Wicinski | B60R 7/043 224/275 |
| 2011/0108593 A1* | 5/2011 | Caldwell | B60N 3/103 224/545 |
| 2012/0080912 A1* | 4/2012 | Perera | A47C 7/52 297/188.01 |
| 2014/0217256 A1* | 8/2014 | Young | B62J 11/00 248/311.2 |
| 2015/0218875 A1* | 8/2015 | Richards | E05G 1/02 109/51 |
| 2015/0232158 A1* | 8/2015 | Bouse | B63B 35/85 220/200 |

\* cited by examiner

DRINK RECEPTACLE WITH ELASTOMERIC, SEMI-RIGID STRAP FOR INTERFERENCE FIT SECUREMENT

BACKGROUND OF THE INVENTION

Field of the Invention

This invention relates to a drink receptacle and more particularly relates to drink receptacle used in residential applications for holding one or more a drink container upright in an easily accessible position.

Description of the Related Art

Cup holders integrated with dashboards or furniture are known in the art. Individuals recreating or relaxing in residential settings, including those making use of indoor or outdoor seating, frequently find it useful and enjoyable to consume a beverage and seek means of easily accessing such beverages with minimal effort.

Cup holders often double as an insulating sleeve for keeping a beverage cool, are occasionally recessed into arm rests of chairs and couches, although most indoor and outdoor furniture does not provide integrated cup holders for securing drinks or refreshments. The prior art which teaches cup holders discloses trays, arm rests, and protruding receptacles with recessed apertures arranged often in a side-by-side configuration or front-to-back relation. Such devices are not adjustable and cannot be adapted for use with furniture not designed with integrated securement means. There are no apparati known in the art which are easily interchanged from one piece of furniture to another.

Detachable cup holders aim to remedy this problem are not universal and often are compatible only with a small cross-segment of furniture.

Thus, it is desirable to provide a compact beverage container holder which can be adapted for use with furniture of almost any size and shape and which can easily be adjusted to facilitate convenient access in arm's reach.

SUMMARY OF THE INVENTION

From the foregoing discussion, it should be apparent that a need exists for a drink receptacle with an elongated semi-rigid strap for interference fit securement.

Beneficially, such a system would overcome many of the difficulties of the prior art by providing a cup holder easily interchangeable with an elongated strap frictionally fit between furniture components.

The present invention has been developed in response to the present state of the art, and in particular, in response to the problems and needs in the art that have not yet been fully solved by currently available apparati and methods. Accordingly, the present invention has been developed to provide an interchangeable drink receptacle comprising: an elongated semi-rigid strap adapted to form a friction fit between one or more cushions of furniture, wherein an unconnected distal end of the strap positions away from a proximal end of the strap, the distal end positioned within the furniture; a cylindrical receptacle for securing a beverage, the cylindrical receptacle affixed to a proximal end of the strap, the cylindrical receptacle having an open top end and a closed bottom end; wherein the semi-rigid strap is adapted to facilitate easy access to beverage.

The cylindrical receptacle may be permanently affixed to the proximal end of the strap using one or more of clips, snaps, buckles and Velcro®. The cylindrical receptacle may be detachably affixed to the proximal end of the strap. The cylindrical receptacle, is some embodiments, is detachably affixed to the proximal end of the strap using Velcro®.

The proximal end of the strap may be folded back and affixed in place to form a roughly planar surface for engaging the cylindrical receptacle. In other embodiments, the semi-rigid strap may be formed primarily from elastomeric materials while in still further embodiments, the semi-rigid strap is formed primarily from organic materials.

The semi-rigid strap may position under a cushion forming a friction fit with the cushion by the weight of a user sitting on the cushion.

The cup holder, in still further embodiments, is tapered toward the bottom surface.

A second interchangeable drink receptacle is also provided comprising: an elongated, flexible elastomeric strap adapted to form a friction fit with furniture and to secure a drink receptacle; a drink receptacle for securing a beverage detachably affixable to the strap using Velcro®, the receptacle having an open top end and a closed bottom end.

The cup holder may be tapered toward the bottom surface and the cylindrical receptacle is detachably affixed to the proximal end of the strap.

The cylindrical receptacle may be detachably affixed to the proximal end of the strap using Velcro®.

The proximal end of the strap, in some embodiments, is folded back and affixed in place to form a roughly planar surface for engaging the cylindrical receptacle.

In still further embodiments, the semi-rigid strap is formed primarily from elastomeric materials. The semi-rigid strap may be formed primarily from organic materials.

The semi-rigid strap may position under a cushion forming a friction fit with the cushion by the weight of a user sitting on the cushion.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
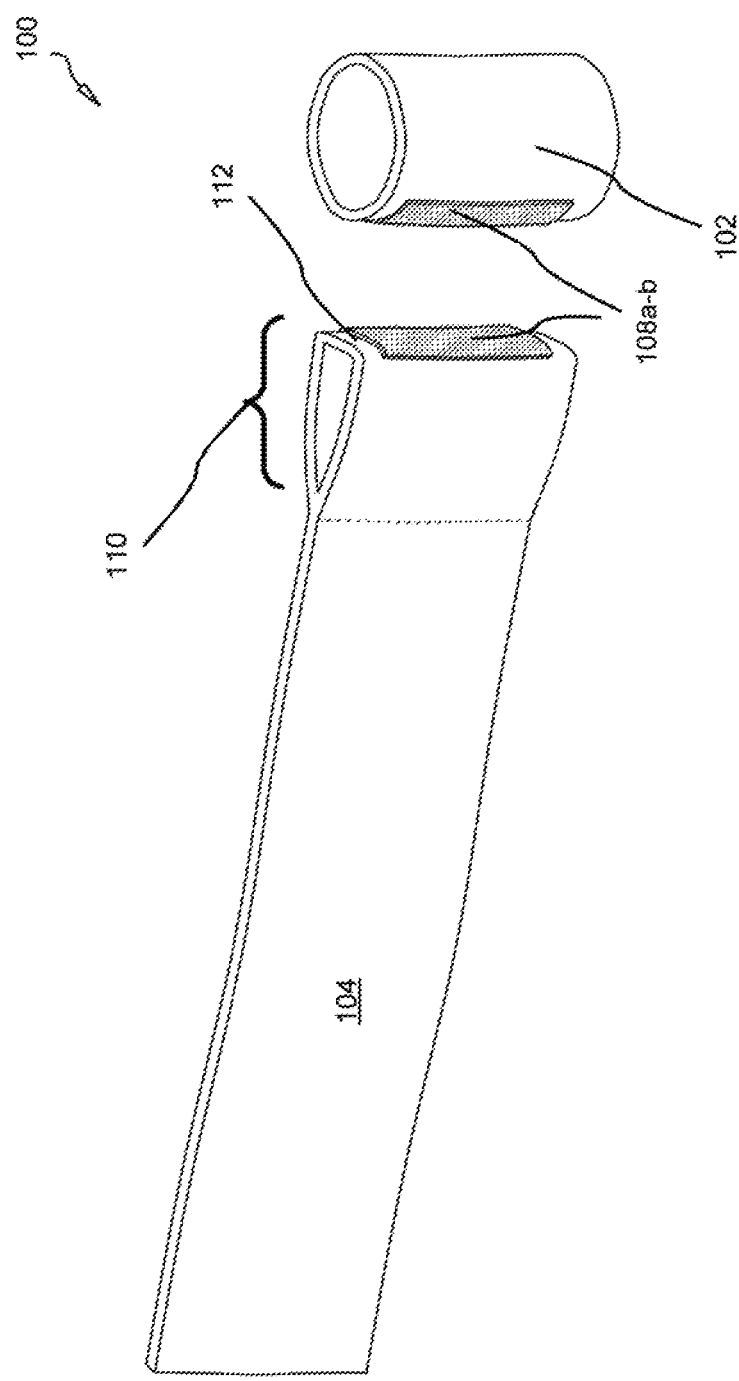
FIG. 1 is an upper forward perspective view of an interchangeable drink receptacle with elastomeric strap in accordance with the present invention.

FIG. 1 is an upper forward perspective view of an interchangeable drink receptacle 100 with elastomeric strap in accordance with the present invention.

The device 100 preferably comprises a woven elastomeric strap 104 formed from a durable material such as nylon or polyester, although organic materials can be used such as cotton or leather. The strap 104 may also be formed as a one-piece molded strap. This strap 104 can have a width varying from about one half an inch to twelve inches or more and is formed from either a flexible material or semi-rigid material.

In various embodiments, a cylindrical receptacle 102 is affixed to the strap 104. The receptacle 102 may be detachably affixed to the strap 104 using clips, buckets, other means known to those of skill in the art, including Vecro®. The cylindrical receptacle 102 is affixed at a proximal end 106 of the strap 104.

The receptacle 102 may comprise a hollow cylindrical enclosure with an open top end and a closed bottom end, the open top end for receiving a beverage. In various embodiments, the receptacle 102 is tapered toward its lower surface, or bottom surface The strap 104 comprises a distal end which positions along with the bulk of the strap 104 within furniture, usually beneath a cushion, between cushions, or between a cushion of the body of the furniture or an arm rest.

In various embodiments, the proximal end 106 of the strap 104 is folded back to form a connector 110 having a planar proximal surface 112 or convex proximal surface, which planar proximal surface may secure male or female Velcro® hooks or pads 108a-b.

The connector 110, as shown, is in the form of a triangle with two folded corners, but may have only one folded corner. Other connectors 110 may include a buckle, a carabiner, and the like.

The strap 104 is interrupted, meaning the strap 104 terminates with the distal end or terminal end, which is not connected to anything.

The strap 104 is adapted form a friction fit with furniture, preventing movement of the strap 104 within the furniture and consequently securing a beverage in place.

Figure 2:
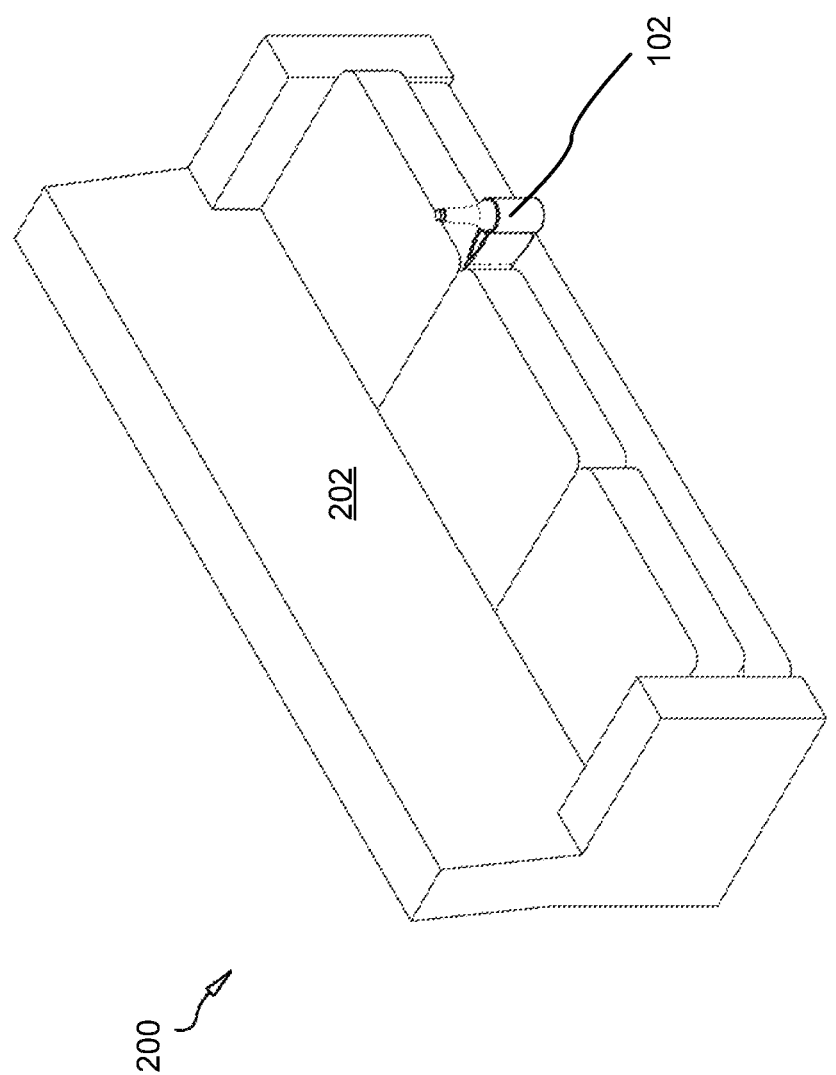
FIG. 2 is an environmental perspective view of an interchangeable drink receptacle with elastomeric strap in accordance with the present invention.

FIG. 2 is an environmental perspective view of an interchangeable drink receptacle with elastomeric strap 200 in accordance with the present invention.

The device 200 may be used with a wide variety of structures and furniture including, but not limited, chairs, beds, couches, recliners, tables, stools, end tables, clocks, and the like. As shown, the device 200 is positioned between cushions on the couch.

Figure 3:
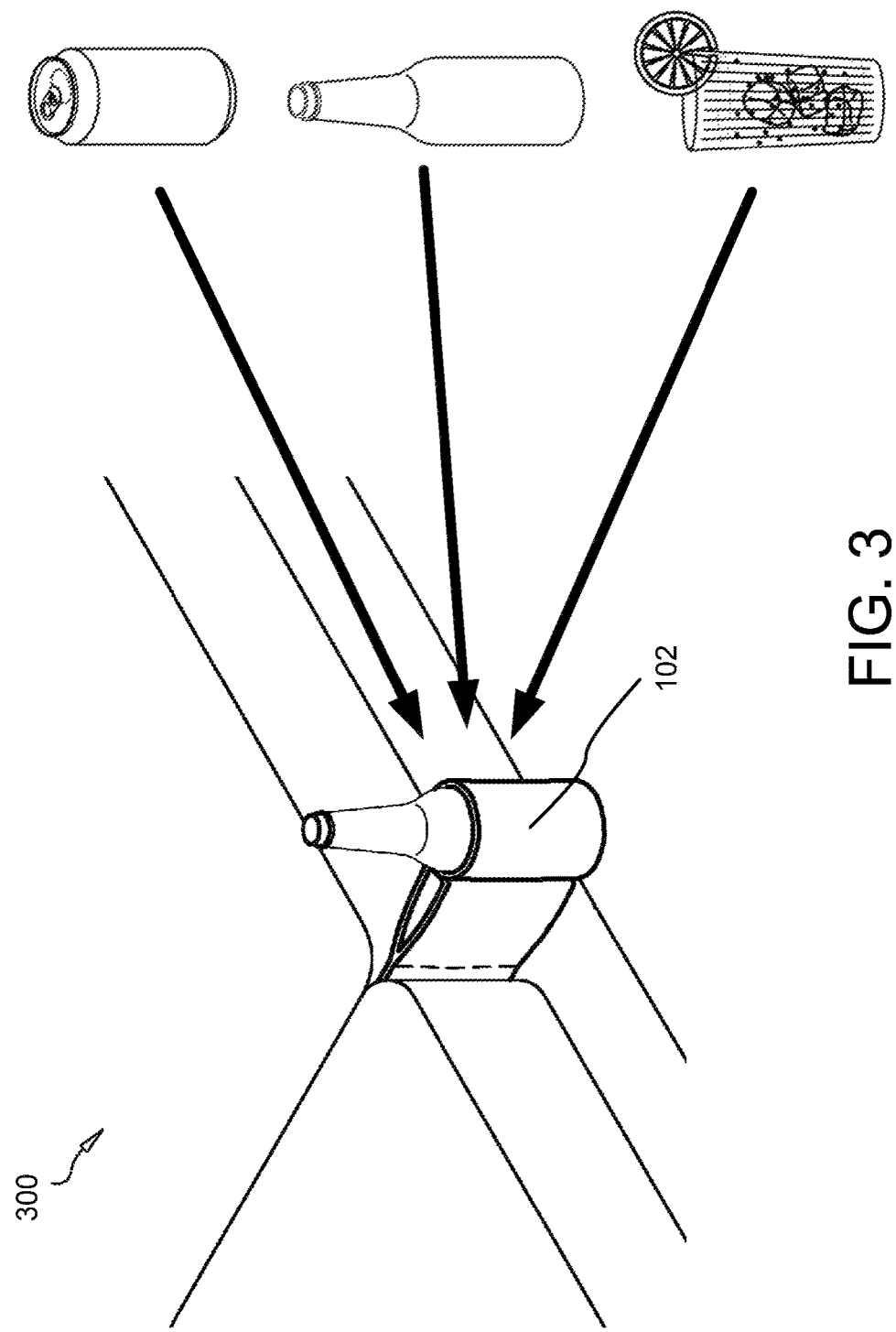
FIG. 3 is an exploded environmental perspective view of an interchangeable drink receptacle with elastomeric strap in accordance with the present invention.

FIG. 3 is an exploded environmental perspective view of an interchangeable drink receptacle with elastomeric strap 300 in accordance with the present invention.

In the shown embodiment, the device 300 inserts alongside or beneath a cushion of a chair or sofa. The strap 104 does not need to be wrapped around the cushion itself, rather the strap 104 may position beneath or alongside the cushion and make use of the friction fit therein created to secure the receptacle 102 and drink.

Figure 4:
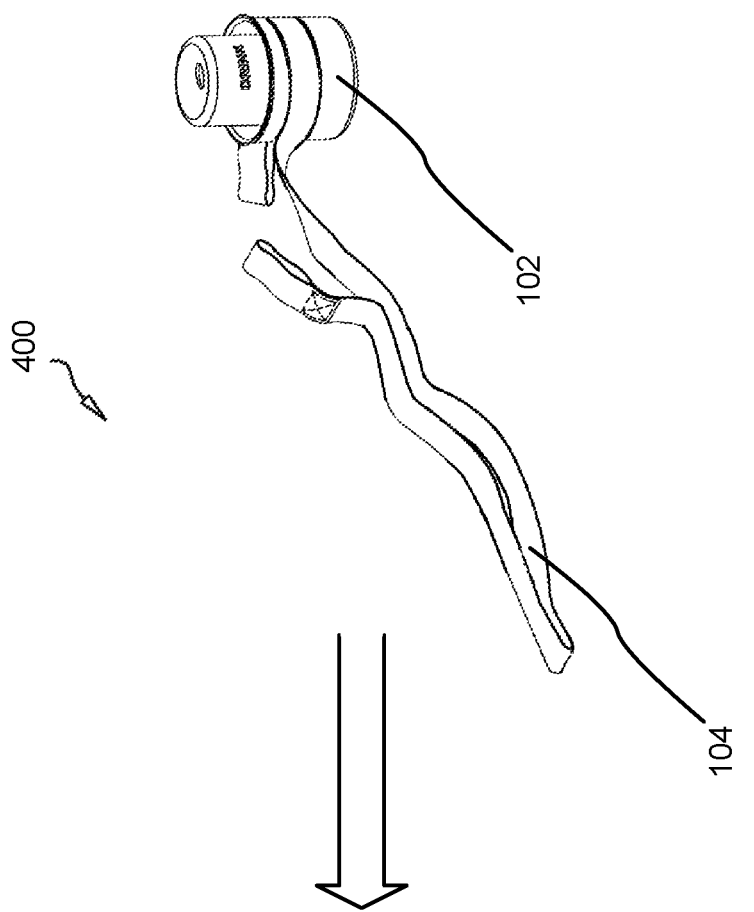
FIG. 4 is an environmental perspective view of an interchangeable drink receptacle with an uninterrupted elastomeric strap in accordance with the present invention.
Figure 4:
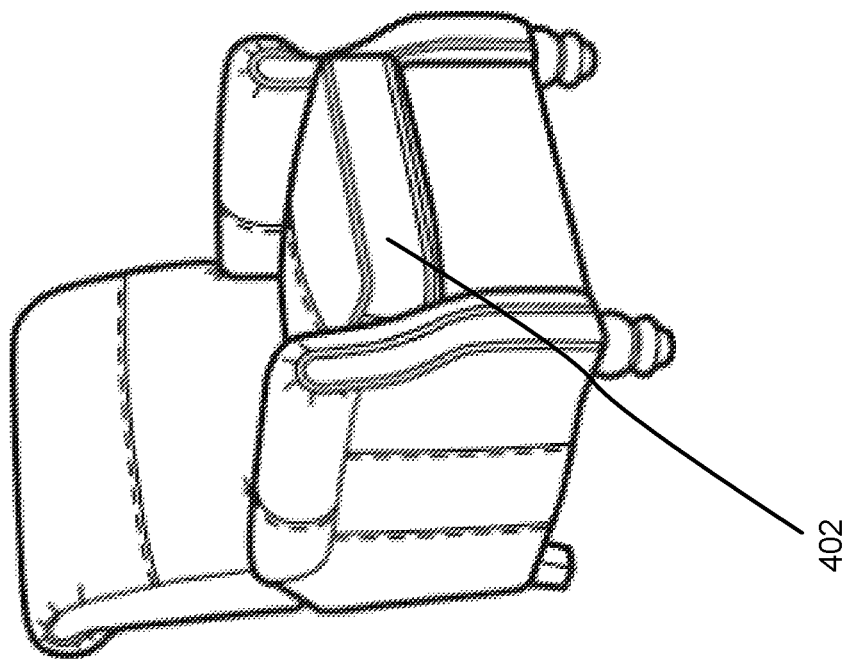

FIG. 4 is an environmental perspective view of an interchangeable drink receptacle with an uninterrupted elastomeric strap 400 in accordance with the present invention.

The strap 104 in the shown embodiment comprises a strap 104 which folds back over itself and affixes at both the distal and proximal ends to the receptacle 102.

Figure 5:
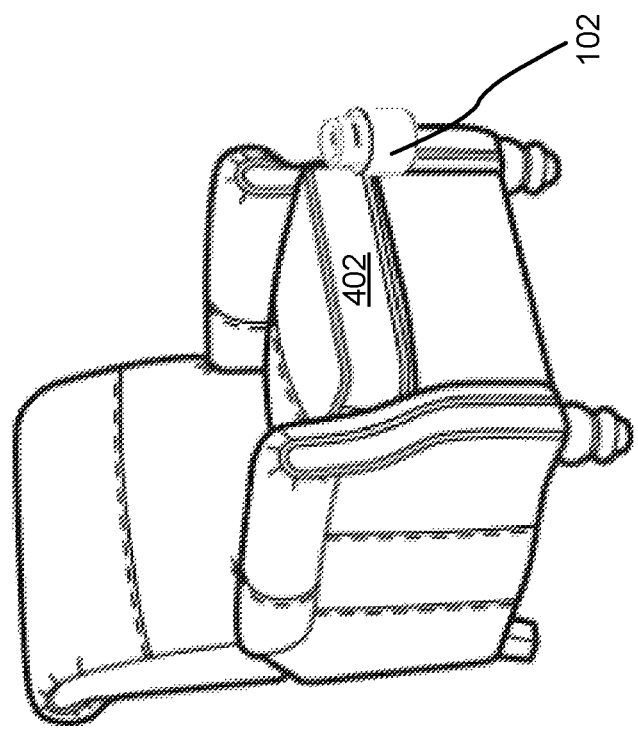
FIG. 5 is an environmental perspective view of an interchangeable drink receptacle with elastomeric strap in accordance with the present invention.

FIG. 5 is an environmental perspective view of an interchangeable drink receptacle with elastomeric strap in accordance with the present invention.

The device 500 is affixed as shown between the cushion 402 and the arm rest. The device may insert and position beneath the cushion or alongside it.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An interchangeable drink receptacle comprising:
   an elongated semi-rigid strap adapted to form a friction fit under a cushion and a body of furniture preventing movement of the strap within the furniture, wherein an unconnected distal end of the strap positions away from a proximal end of the strap, the distal end positioned within the furniture, the friction fit formed when the distal end and proximal end are not connected and the strap is interrupted;
   a cylindrical receptacle for securing a beverage, the cylindrical receptacle affixed to a proximal end of the strap, the cylindrical receptacle having an open top end and a closed bottom end;
   wherein the semi-rigid strap is adapted to facilitate easy access to beverage;
   wherein the proximal end of the strap is folded back and affixed in place to form a triangle having a roughly planar surface for engaging the cylindrical receptacle.

2. The apparatus of claim 1, wherein the cylindrical receptacle is detachably affixed to the proximal end of the strap.

3. The apparatus of claim 1, wherein the cylindrical receptacle is detachably affixed to the proximal end of the strap using Velcro®.

4. The apparatus of claim 1, wherein the semi-rigid strap is formed primarily from elastomeric materials.

5. The apparatus of claim 1, wherein the semi-rigid strap is formed primarily from organic materials.

6. The apparatus of claim 1, wherein the semi-rigid strap positions under a cushion forming a friction fit with the cushion by the weight of a user sitting on the cushion.

7. The apparatus of claim 1, wherein the drink receptacle is tapered toward the bottom surface.

* * * * *